United States Patent [19]

McLendon

[11] Patent Number: 4,640,144
[45] Date of Patent: Feb. 3, 1987

[54] MOTION INTERCONVERSION APPARATUS

[76] Inventor: Martin McLendon, 11173 Kelowna St., San Diego, Calif. 92126

[21] Appl. No.: 764,795

[22] Filed: Aug. 12, 1985

[51] Int. Cl.[4] ............................................. F16H 25/12
[52] U.S. Cl. ......................................... 74/56; 74/569; 91/499; 92/71
[58] Field of Search ....................... 74/56, 60, 57, 569; 91/499, 501; 92/71; 417/269

[56] References Cited

U.S. PATENT DOCUMENTS

| 970,640 | 9/1910 | McClintock | 74/56 X |
|---|---|---|---|
| 1,565,184 | 12/1925 | Miller | 74/57 X |
| 2,138,194 | 11/1938 | Pfauser | 92/71 X |
| 2,941,475 | 6/1960 | Blair | 417/269 X |
| 3,249,052 | 5/1966 | Karlak | 91/499 X |
| 3,356,080 | 12/1967 | Howard | 74/60 X |
| 4,077,269 | 3/1978 | Hodgkinson | 74/60 |
| 4,563,915 | 1/1986 | Tibbals, Jr. | 74/60 X |

FOREIGN PATENT DOCUMENTS 10854  2/1981  Japan .................................. 74/56

Primary Examiner—Thomas F. Callaghan
Attorney, Agent, or Firm—Charles C. Logan II

[57] ABSTRACT

Apparatus for interconverting reciprocating and rotative motion is comprised of a disc shaped rotative slant having a first continuous groove formed on its top surface and a second continuous groove formed in its bottom surface. The first and second continuous grooves have an elliptical configuration and they are defined by harmonic curves. An axle passes through the center of the rotative slant and the rotative slant makes an acute angle with respect to the longitudinal axis of the axle. At least one ball is adapted to ride in the first and second continuous grooves of the rotative slant and each of these pairs of balls have a coupling slide with structure for capturing the balls in these grooves while permitting free rotation therein. Within the housing for the apparatus is a track assembly for each of the coupling members that permit the coupling to travel in a reciprocal motion. Attached to the top of each of the coupling members is an extension rod which in turn has a piston mounted on its upper end and it travels within a cylinder mounted on the housing of the apparatus.

9 Claims, 5 Drawing Figures

MOTION INTERCONVERSION APPARATUS

BACKGROUND OF THE INVENTION

The invention relates to apparatus for interconversion of reciprocal and rotary motions, and more particularly to an apparatus for interconverting motion between a rotary axis and a system in reciprocal motion in a path parallel to said rotary axis.

In crankless motion conversion mechanisms, reciprocating motion is converted into rotary motion, or vice versa occasionally by the use of a rotative slant also know as a swash plate. Such motion interconverting devices may be utilized in conjunction with internal combustion engines of 2 or 4 cycle or diesel design, steam engines, sterling cycle engines, external combustion engines, fluid compressing devices and other machines.

Binding problems are however encountered in certain phases of the circular motion of the rotative slant, depending upon the nature of associated components which couple to the reciprocating system. The binding or uneven stress distribution in the rotative slant member promote diminished efficiency and durability.

It is accordingly an object of the present invention to provide apparatus for the interconversion of reciprocal and rotary motion having improved efficiency of operation and durability.

It is a further object of this invention to provide apparatus of the aforesaid nature of simple and rugged construction which may be economically manufactured.

These objects and other objects and advantages of the invention will be apparent from the following description.

SUMMARY OF THE INVENTION

The above and other beneficial objects and advantages are accomplished in accordance with the present invention by an improved apparatus which comprises a rotative slant having an elliptical configuration. An axle passes through the center of the rotative slant and it makes an acute angle with the rotative slant. The acute angle is preferably between 5 and 50 degrees. A first continuous groove is formed in the top surface of the ring portion of the rotative slant and a second continuous groove is formed in the bottom surface of the ring portion of the rotative slant. These grooves are preferably formed by the arc of a circle and are generally 110 degrees or less. The center of the arcs of the first and second continuous grooves lie on a vertical axis that is parallel to the axle axis. Also both the first and second continuous grooves are formed in a configuration that conforms to a harmonic curve.

Separate balls of hard metal such as steel, chrome molybdenum and the like are caused to ride within the first and second continuous grooves. These balls are held stationary by retaining structure in the coupling slides which house the balls in cup-like depressions while permitting free rotation of the balls. The coupling slides also engage a straight track which contrains the coupling slide to reciprocating linear motion along a line parallel to the axis of the axle. The coupling slide is also attached to rigid extension associated with a mechanism such as a piston undergoing reciprocal motion.

DESCRIPTION OF THE DRAWINGS

For a fuller understanding of the nature and objects of the invention reference should be had to the following detailed description taken in connection with the accompanying drawings forming a part of this specification and in which similar numerals of reference indicate corresponding parts in all the figures of the drawings.

DESCRIPTION OF THE PREFERRED EMBODIMENT

Figure 1:
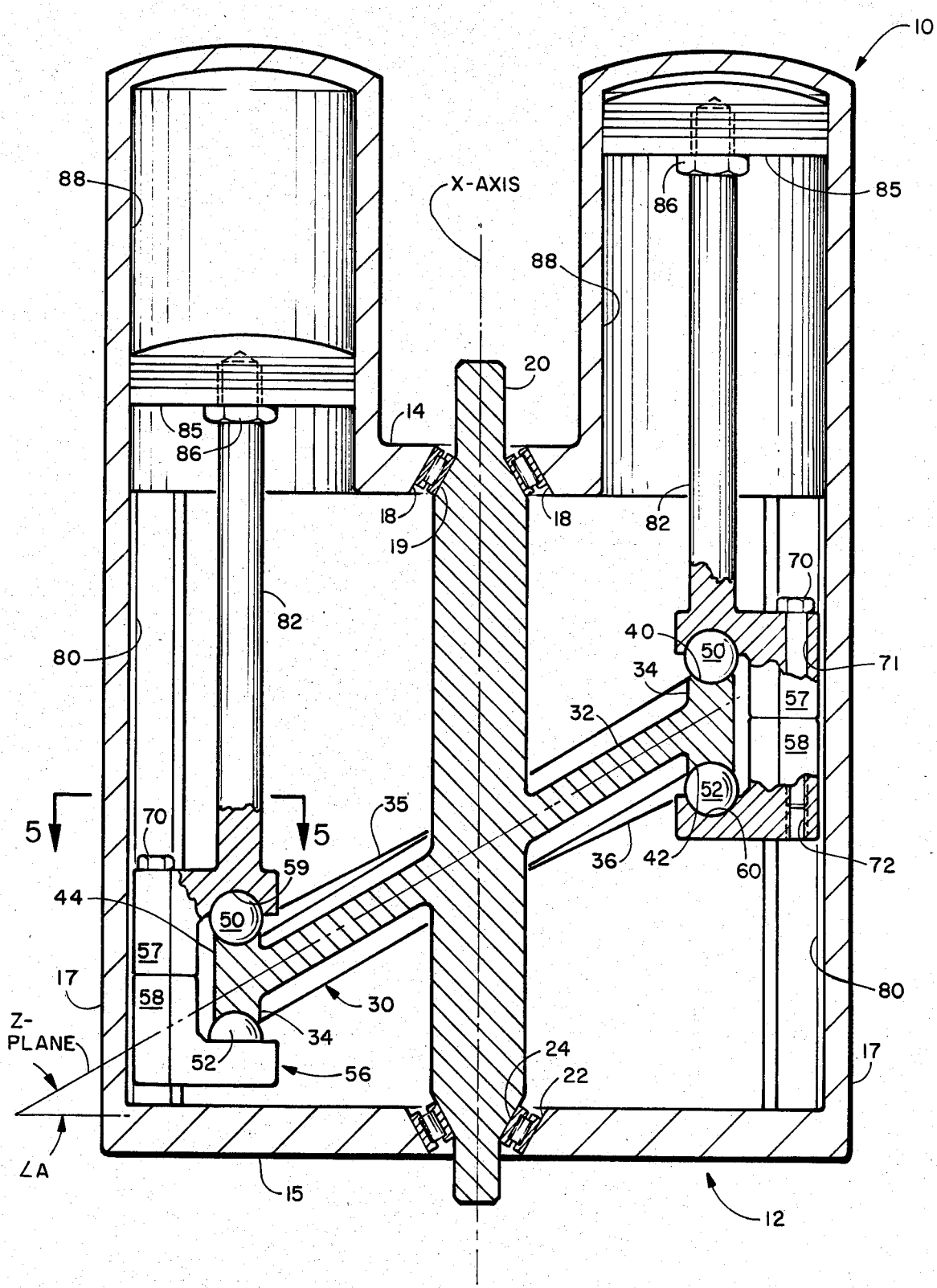
FIG. 1 is a cross sectional elevation view through the center of an embodiment of applicant's novel apparatus for interconversion of reciprocal and rotary motion.
Figure 2:
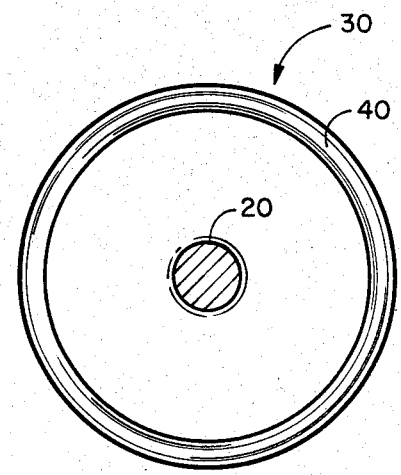
FIG. 2 is a top plan view of the rotative slant taken along the axis of the axle.
Figure 3:
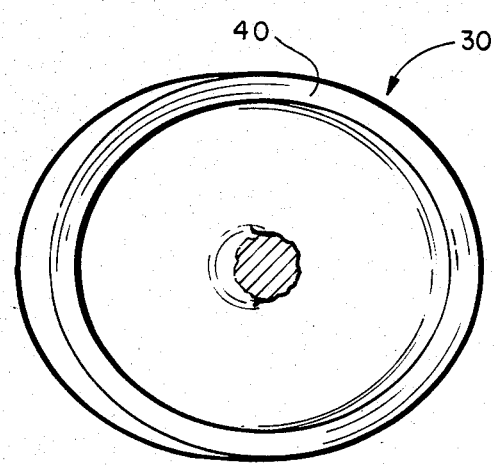
FIG. 3 is a top plan view of the rotative slant taken perpendicular to the plane passing through the rotative slant.

Applicant's novel apparatus for interconversion of reciprocal and rotary motion will be described by referring to FIGS. 1-5 of the drawings. The apparatus is generally designated numeral 10. It has a housing 12 having a top wall 14, a bottom wall 15, and side walls 17. An aperture 18 is formed in top wall 14 and a plurality of bearings 19 rotatively support axle 20 therein. The bottom end of axle 20 passes through an aperture 22 having bearings 24 rotatively supporting the bottom end of the axle. Axle 20 has a longitudinally extending x-axis.

A rotative slant 30 is mounted on axle 20. It has a disc-shaped webb portion 32 and a ring portion 34. As viewed from above along the x-axis the slant is viewed as having a circular configuration. When viewed from a perspective perpendicular to a plane which passes midway the top surface 35 and the bottom surface 36, the rotative slant has an elliptical configuration.

Figure 4:
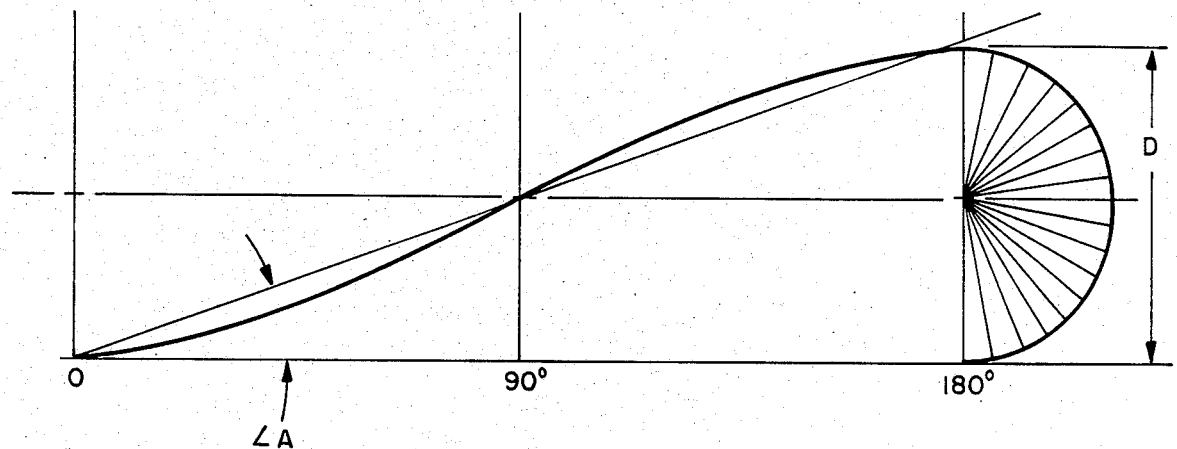
FIG. 4 is a graphic illustration of how the harmonic curvature of the continuous grooves is formed.

A continuous groove 40 is formed in the top surface 35 and a continuous groove 42 is formed in the bottom surface 36 of ring portion 34. The side wall 44 of ring portion 34 lies in an axis parallel to the x-axis of axle 20. The disc-shaped webb portion 32 has a z-plane that passes through it and this plane makes an angle A with the x-axis of center axle 20. Angle A is preferably formed between 5 and 50 degrees. Each of the tracking grooves 40 and 42 have a harmonic curve configuration such as illustrated in FIG. 4. In this particular figure, a 20 degree angle is used and this determines the diameter D which is used to plot the harmonic curve configuration.

A first pair of spherical balls 50 are adapted to ride in upper tracking groove 40. A second pair of spherical balls 52 are adapted to ride in bottom tracking groove 42. Balls 52 are held in position within its matingly groove by retaining structure in the form of a coupling slide 56 having a top portion 57 and a bottom portion 58. A spherical cup-shaped socket 59 captures the top surface of spherical balls 50 and a cup-shaped spherical socket 60 captures the bottom of spherical balls 52. The upper and lower tracking grooves 40 and 42 have the configuration of a portion of a circular arc and this arc is preferably 110 degrees or less.

Coupling slide 56 has its upper and lower portions fastened together by a bolt 70 passing through a bore aperture 71 and a threaded bore aperture 72 of the respective parts.

Figure 5:
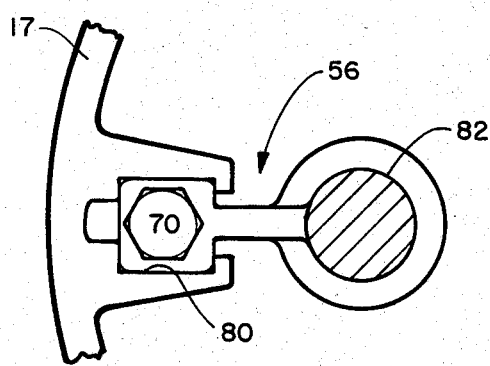
FIG. 5 is a cross sectional view taken along lines 5—5 of FIG. 1.

As seen in FIG. 5, coupling slide 56 has a portion which protrudes into guide track 80 to allow for reciprocal up and down travel of coupling slide 56.

An extension rod 82 is attached to the top surface of each of the coupling slides 56. Attached to the top end of extension rod 82 is a piston 85 that may be detachably separable therefrom by loosening packing nut 86. Piston 85 travels up and downwardly within cylinder 88.

In operation rotative motion to axle 20 will cause the respective pistons to travel upwardly and downwardly with in the cylinders 88. Likewise a driving force which causes the pistons to travel up and downwardly will be translated into a rotative motion that is given to center axle 20.

What is claimed is:

1. Apparatus for interconversion of reciprocal and rotary motion comprising:
   an axle having a longitudinally extending axis;
   a housing;
   means for rotationally mounting said axle in said housing;
   a rotative slant having a ring portion having a top surface and a bottom surface, said rotative slant being mounted on said axle so that they rotate as one, said rotative slant having a predetermined plane that passes through it intermediate the top and bottom surface of its ring portion, said predetermined plane intersects the longitudinal axis of said axle at a predetermined acute angle;
   a first continuous groove formed in the top surface of the ring portion of said rotative slant and a second continuous groove formed in the bottom surface of the ring portion of said rotative slant;
   at least one primary ball adapted to ride in said first continuous groove and at least one secondary ball adapted to ride in said second continuous groove;
   at least one coupling slide for each pair of primary and secondary balls, said coupling slide having a first retaining means for capturing the top surface of said primary ball and maintaining it in said first continuous groove while permitting free rotation therein and second retaining means for capturing the bottom surface of said secondary ball and maintaining it in said second continuous groove while permitting free rotation therein;
   track means within said housing oriented parallel to the axis of said axle, said coupling slide having track engaging means which allows it to slide along said track means; and
   an extension rod aligned laterally offset from and parallel to the longitudinal axis of said axle, the bottom end of said extension rod being attached to the top of said coupling slide.

2. Apparatus as recited in claim 1 wherein said predetermined acute angle that the plane of said rotative slant intersects the longitudinal axis of said axle is in the range of 5-50 degrees.

3. Apparatus as recited in claim 1 wherein said first and second continuous grooves are substantially equally spaced from each other around their entire perimeters.

4. Apparatus as recited in claim 1 wherein said first and second continuous grooves are substantially defined by harmonic curves.

5. Apparatus as recited in claim 1 wherein said first and second continuous grooves substantially define an ellipse.

6. Apparatus as recited in claim 1 wherein said coupling slide is formed of separate top and bottom portions that are secured together by fastening means.

7. Apparatus as recited in claim 1 further comprising a piston mounted on the top end of each of said extension rods.

8. Apparatus as recited in claim 1 wherein there are at least two sets of primary and secondary balls with each having its own coupling slide and track means.

9. Apparatus for interconversion of reciprocal and rotary motion comprising:
   an axle having a longitudinally extending axis;
   a housing;
   means for rotationally mounting said axle in said housing;
   a rotative slant having a top surface and a bottom surface, said rotative slant being mounted on said axle so that they rotate as one, said rotative slant having a predetermined plane that passes through it intermediate its top and bottom surface, said predetermined plane intersects the longitudinal axis of axle at a predetermined acute angle;
   a first continuous groove formed in the top surface of said rotative slant and a second continuous groove formed in the bottom surface of said rotative slant;
   at least one primary ball adapted to ride in said first continuous groove and at least one secondary ball adapted to ride in said second continuous groove;
   at least one coupling slide for each pair of primary and secondary balls, said coupling slide having a first retaining means for capturing the top surface of said primary ball and maintaining it in said first continuous groove while permitting free rotation therein and second retaining means for capturing the bottom surface of said secondary ball and maintaining it in said second continuous groove while permitting free rotation therein;
   track means within said housing oriented parallel to the axis of axle, said coupling slide having track engaging means which allows it to slide along said track means; and
   an extension rod aligned laterally offset from and parallel to the longitudinal axis of said axle, the bottom end of said extension rod being attached to the top of said coupling slide.

* * * * *